United States Patent Office 3,490,033
Patented Jan. 13, 1970

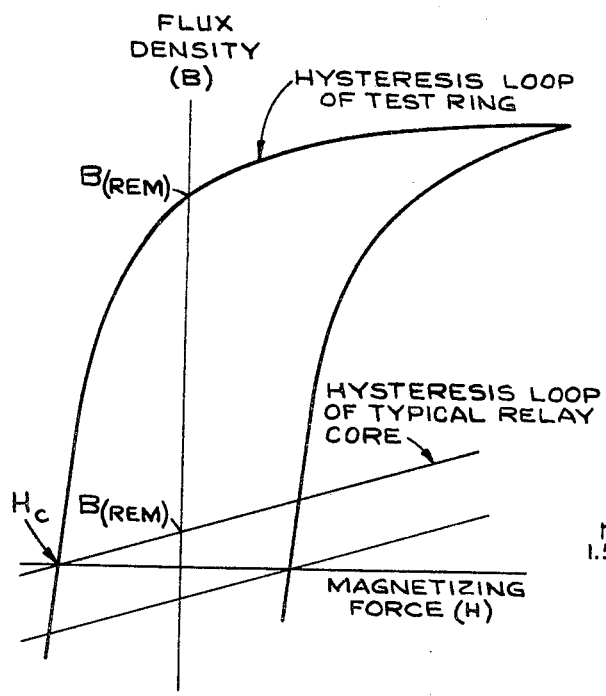
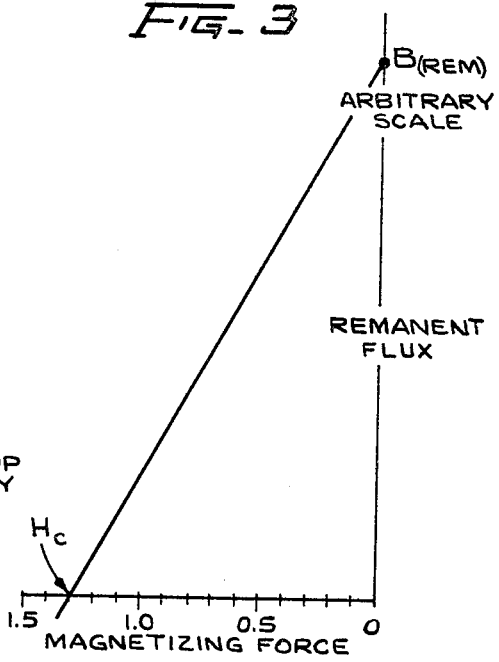
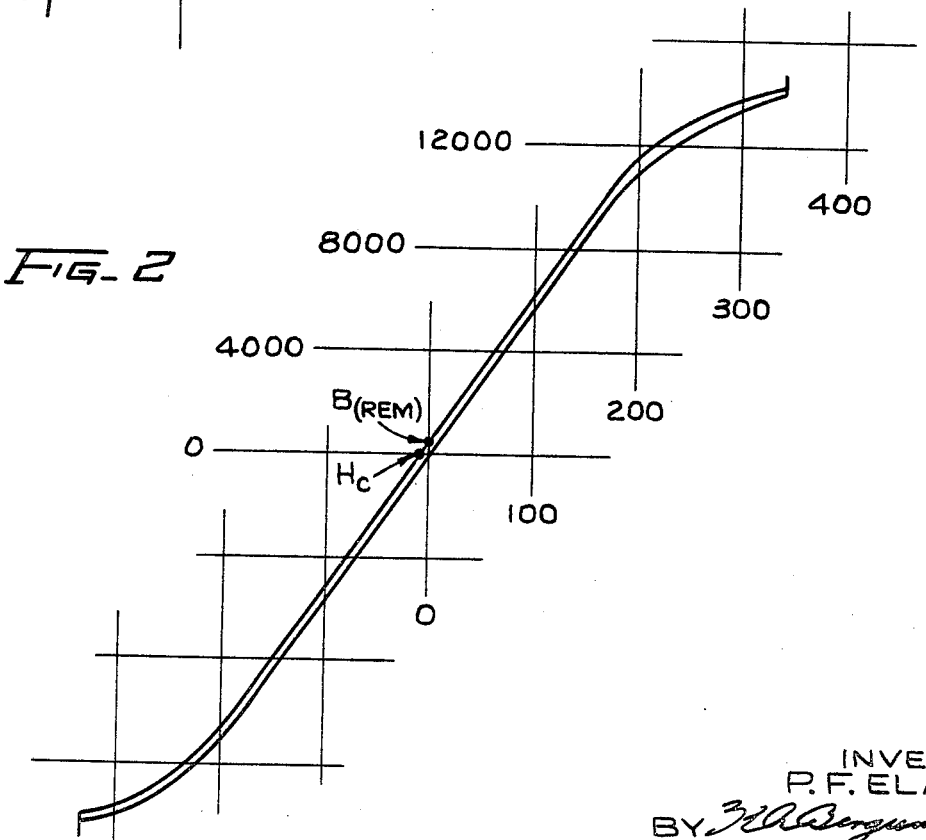

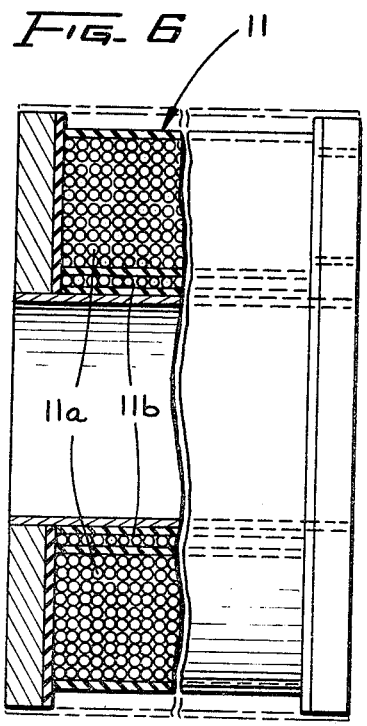
FIG. 6
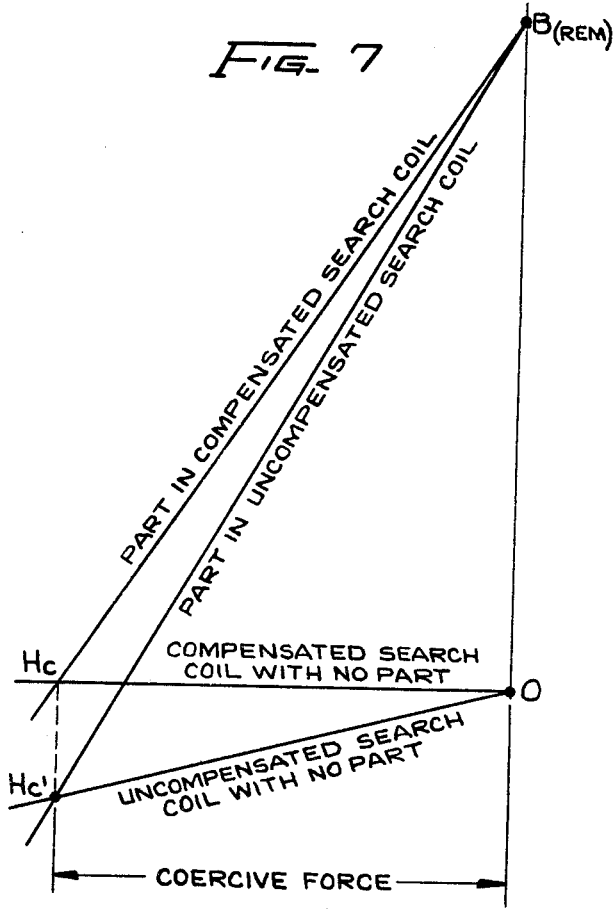
FIG. 7
FIG. 8
COMPARISON OF COERCIVE FORCE MEASUREMENTS
(OERSTEDS)
| RELAY CORE | PERMEAMETER | NEW METHOD |
|---|---|---|
| No. 10 | 1.4 | 1.48 |
| No. 13 | 1.75 | 1.75 |
| No. 19 | 2.1 | 2.18 |
| CYLINDRICAL SHELL | ROWLAND RING | NEW METHOD |
|---|---|---|
| No. 6-2 | 0.86 | 0.89 |
| No. 7-1 | 1.57 | 1.59 |
| No. 13 | 0.65 | 0.62 |

3,490,033
METHODS OF AND APPARATUS FOR MEASURING THE COERCIVE FORCE OF PIECE PARTS
Paul F. Elarde, Naperville, Ill., assignor to Western Electric Company, Incorporated, New York, N.Y., a corporation of New York
Filed Mar. 11, 1968, Ser. No. 712,131
Int. Cl. G01r 33/14
U.S. Cl. 324—40
11 Claims

ABSTRACT OF THE DISCLOSURE

An extension of remanence testing is employed to measure the coercive force of piece parts having a geometry which may depart appreciably from the standard ring or elongated rod shaped test specimen. The actual coercive force of a given piece part is measured by re-saturating it in a magnetic field after a remanence test, then reducing this field to zero, and finally establishing a magnetic field of a polarity opposite to the re-saturating field and of sufficient strength to drive the remanent magnetic flux in the part, as determined by the previous remanence test, to zero. By utilizing a common solenoid to establish the reversible magnetic fields, and by knowing the field vs. current relationship of the solenoid from a previous calibration, accurate values of coercive force for the part can be readily determined.

BACKGROUND OF THE INVENTION

Field of the invention

In the manufacture of electrical equipment and, particularly, with respect to electro-mechanical types of apparatus, knowledge of the magnetic properties of the materials employed in the construction of many of the parts of such devices is important so as to insure high quality and reliable and satisfactory operation of such devices. For example, it is very desirous in the manufacture of relays to determine not only the remanence of certain parts thereof, but also the actual value of coercive force of the parts so as to insure that the subsequently assembled relay will operate satisfactorily within prescribed limits. The testing and categorizing of the stock materials from which such relay parts are manufactured obviously would enhance the acceptable yield of the subsequently manufactured relays and, thereby, substantially increase the efficiency and reduce the cost of manufacturing such devices.

Description of the prior art

For reasons described in greater detail hereinafter, the measuring of coercive force, particularly values less than two oersteds, has been restricted heretofore primarily to materials formed into either a standard test ring or an elongated rod geometry, with the latter having a length-to-diameter ratio of at least one hundred. In the case of ring-shaped specimens, the well-known Rowland ring method has been employed. With respect to elongated rod specimens, the use of a solenoid or a permeameter and Chattock potentiometer method has been employed. However, these methods are intended primarily for laboratory use, as the apparatus is generally complex and expensive, and the methods of measurement normally too time consuming for industrial applications.

An indirect approach to obtaining relative values of coercive force of piece parts involves the use of test rings blanked from the stock material employed to manufacture a particular part. The rings, in the case of stock material to be used for making relay cores, for example, are normally heat treated with the parts before the coercive force of the blanked rings is measured, normally by the aforementioned Rowland ring method. Unfortunately, such an indirect method does not provide a true measurement of the coercive force of the manufactured part itself, especially as it is to be used in a given environmental application. Nor is this indirect method of coercive force measurement conducive to assembly line applications, particularly where diverse piece parts are involved and/or where a number of manufacturing sources for the raw stock material are used.

SUMMARY OF THE INVENTION

The present method of and apparatus for measuring the coercive force of piece parts, which may depart considerably from the ideal test geometries, involves an extension of remanence testing. More specifically, the present invention utilizes a common solenoid for the measurement of both remanence and coercive force. The actual value of coercive force is measured by first re-saturating the part within a magnetizing field of the solenoid after the remanence test. This field is then gradually reduced to zero, the current in the solenoid reversed, and a field of opposite polarity gradually increased until the monitored value of remanent flux in the part, as previously determined by the remanence test, has been reduced to zero.

By accurately evaluating the magnetic field necessary to accomplish this result, through knowledge of a previously calibrated field vs. current constant for the solenoid, coercive force can be readily calculated. In order to obtain finer control over the current vs. field relationship of the solenoid in establishing the negative magnetizing field, the invention contemplates the utilization of a coaxial solenoid. This solenoid utilizes a single layer winding positioned within the larger multi-layer main or saturating winding for establishing the necessary negative magnetizing field.

The invention also contemplates the use of a recording fluxmeter and associated hysteresigraph to provide an automated and directly recorded value of coercive force for a given piece part. Advantageously, the recorded value of coercive force is not adversely affected by any skewed or distorted hysteresis loop characteristics normally experienced with parts which depart considerably from the aforementioned ideal test geometries.

In accordance with another aspect of the invention, a compensating coil is utilized in conjunction with the coaxial solenoid so as to minimize errors normally experienced in coercive force measurements due to differences between successive piece part cross-sectional areas and the effective area of the search coil utilized to support each part within the solenoid.

BRIEF DESCRIPTION OF THE DRAWINGS

FIG. 1 illustrates portions of typical hysteresis loops for a standard ring-shaped test specimen and for a typical core for relays, both made of low carbon steel;

FIG. 2 illustrates a complete and expanded hysteresis loop for a typical relay core;

FIG. 3 is a graph illustrating the second quadrant of a hysteresis loop recorded in accordance with the principles of the present invention, and representing the flux vs. magnetizing force of a typical relay core;

FIG. 6 is a partial, cross-sectional detail view of the coaxial solenoid embodying the principles of the present invention;

FIG. 7 is a graph similar to the one depicted in FIG. 3, but further disclosing a method of measuring the coercive force of a part without the need of a compensating coil in accordance with the principles of this invention; and FIG. 8 is a table illustrating typical measurement results of two different types of test specimens in accordance with both prior art techniques of measuring coercive force and those embodying the principles of this invention.

DETAILED DESCRIPTION

Figure 4:
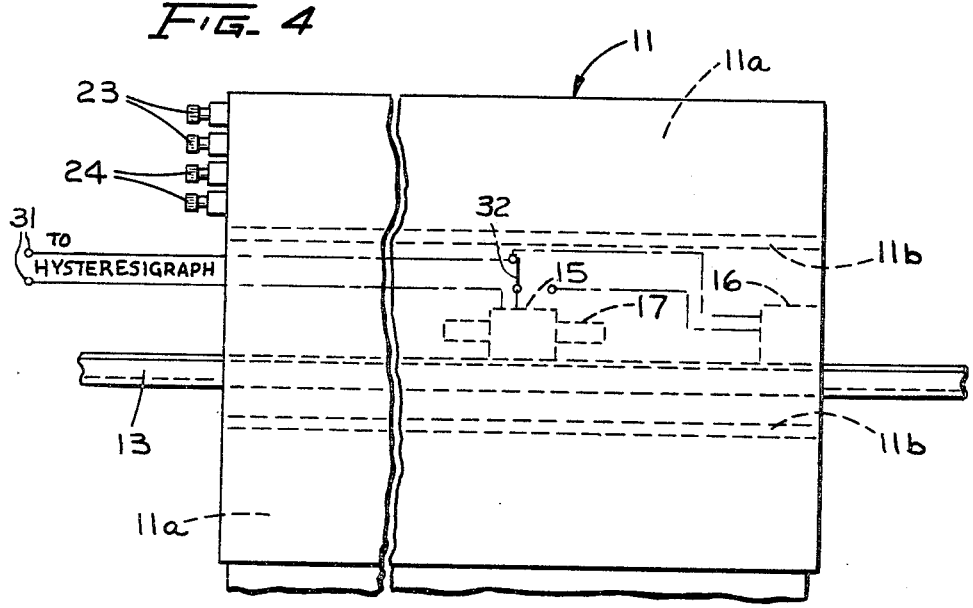
FIG. 4 is a schematic illustrating primarily the field inducing and compensating portions of the apparatus employed in measuring the coercive force of piece parts in accordance with the principles of this invention.

As is well known in the art, the recorded hysteresis loop of a given test specimen reveals a considerable amount of information with respect to the magnetic properties of that specimen. More specifically, the remanence (residual flux density) of the specimen represents exactly one-half the vertical height of the hysteresis loop at zero applied field, i.e., one-half the distance between the two intersecting points of the loop with the B ordinate. Concomitantly, the coercive force of the specimen is represented by one-half the width of the loop at zero induction i.e., one-half the distance between the two intersecting points of the loop with the H abscissa.

Unfortunately, however, whenever the test specimen departs appreciably from either a ring or an elongated rod shaped geometry, the self de-magnetizing effect encountered in such a specimen produces a recorded loop which is distorted or skewed. This naturally makes measurements of coercive force, as well as of remanence, as measured directly from a recorded hysteresis loop, highly susceptible to appreciable error. A comparison of two partial hysteresis loops, one for an ideal ring-shaped test specimen and the other for a typical relay core having a length-to-diameter ratio less than ten, and with both being made of low carbon steel, is illustrated in FIG. 1.

Compounding the problem of obtaining accurate values of coercive force from a direct scaling of the horizontal width of a recorded hysteresis loop for a particular piece part has been the magnitude of the magnetizing field normally required to saturate the part. More specifically, a typical part, such as a short rod having a length-to-diameter ratio less than ten, made of low carbon steel would normally require a magnetizing field of some 400 oersteds to obtain an inductance of 16,000 gausses, whereas this same value of inductance is attained for an ideal ring-shaped specimen of the same material with a magnetizing field of approximately 27 oersteds. As a result, the recorded hysteresis loop for the cited part is very narrow, as best seen in FIG. 2, thus making reliable measurements of coercive force from a direct scaling of the width dimension of the loop at zero inductance very difficult. Expanding the loop by a factor of 100, for example, would provide a means of reading the coercive force more accurately, however, if the B scale were thus expanded, the capacity of the integrator would normally be exceeded unless B scale changes were made at strategic points along the loop.

Such scale expansion of the loop is susceptible to distortions, however, unless at least one reliable check point which is of particular significance with respect to a coercive force measurement can be pin-pointed in advance, thus verifying the accuracy of at least one important expanded portion of the loop. Fortunately, the vertical height of the loop at zero magnetizing field, i.e., the distance between the B-H origin and the upper point at which the loop crosses the B ordinate can be ascertained for any piece part by means of a remanence test. Moreover, once the remanence of a given part is known, then its coercive force can be found in accordance with the principles of this invention by evaluating the magnetic field, or more precisely magnetizing force, required to reduce its remanence, or residual induction, to zero. In order to facilitate a better understanding of the methods and apparatus utilized in accordance with the present invention for measuring coercive force, a brief description will first be given of the steps and basic apparatus involved in measuring the remanence of a piece part.

Remanence testing comprises subjecting a part, positioned within a search coil, to a magnetizing force sufficient to saturate the part initially and, thereafter, carefully reducing the saturating field to zero. The resultant remanent magnetic flux (or flux density) in the part is then measured in a conventional manner by removing the part from the search coil and observing the scaled degree of deflection in a fluxmeter. As is well known, the fluxmeter reading is proportional to remanent flux, and this reading is converted to maxwells through prior calibration with a known flux standard. The measured value of remanence, by definition, represents exactly one-half the vertical height of a recorded hysteresis loop for that part at zero applied magnetic field. This height, representative of measured remanence, is labeled $B_{(REM)}$ in FIG. 1. Reference to a "saturated part" herein means that the induced or remanent magnetism therein will not be appreciably increased by an increase in magnetizing force.

As the slope of the recorded hysteresis loop is essentially the same for all parts having the same geometry, the remanence of a given part, once measured, is very nearly proportional to the coercive force of all of the parts, but the exact value of the latter has heretofore been very difficult, if not impossible, to measure or calculate because of the adverse skewing or distortion of the recorded hysteresis loop thereof, coupled with the very narrow width dimension of the loop for most piece parts. One particular method and apparatus for measuring the remanence of piece parts is disclosed in K. L. Scott Patent 2,541,618, issued Feb. 13, 1951.

In accordance with the present invention, the actual coercive force of a given piece part is found by establishing a magnetic field opposite in polarity to the saturating field and of sufficient strength to drive the remanent magnetic flux previously established in the part during the remanence test to zero. This is accomplished in accordance with one illustrative embodiment by leaving the part and an associated search coil in the same solenoid utilized to saturate the part during the remanence test. After re-saturating the part, current to the solenoid is reversed and slowly adjusted until the same fluxmeter reading (as previously noted when the saturated part was removed from the search coil during the remanance test) is obtained. By knowing the field vs. current constant of the solenoid from a previous calibration, accurate values of coercive force may thus be readily ascertained. It should be understood, however, that the magnitude of the opposite polarity field required to produce a fluxmeter reading equal to that obtained during the remanence test, may be ascertained without necessarily requiring a current vs. field calibrated solenoid. More particularly, the magnetic field in question could be measured, for example, by utilizing a rotating coil gauss meter within the solenoid, or other similar field sensing devices.

The overall method of measuring the coercive force of a piece part in its simplest form in accordance with the principles of this invention thus comprises the following steps: (1) the part, together with its associated search coil, is initially inserted into an elongated solenoid, with the current of the solenoid thereafter being increased until the part is substantially completely saturated, (2) the solenoid current is then reduced to zero and/or the part and search coil are gradually withdrawn from the solenoid as a unit, with the remanent magnetic flux of the part thereafter being measured, preferably with a recording fluxmeter, (3) the part and its associated search coil are then re-inserted within the solenoid, with the current of the latter increased to re-saturate the part. The current of the solenoid is then reduced to zero, the fluxmeter adjusted to zero (the zero point thereby being indicative of the remanent flux in the part as initially defined by the uppermost $B_{(REM)}$ point of the vertical line of the recorded skewed magnetic loop, as depicted in FIG. 1), and the current in the solenoid thereafter reversed and increased until the fluxmeter reads the same value of remanence that was initially recorded. By accurately evaluating the magnetic field necessary to accomplish this result, preferably through knowledge of the field vs. current constant of the solenoid from a previous calibration thereof, coercive force is readily determined.

Figure 5:
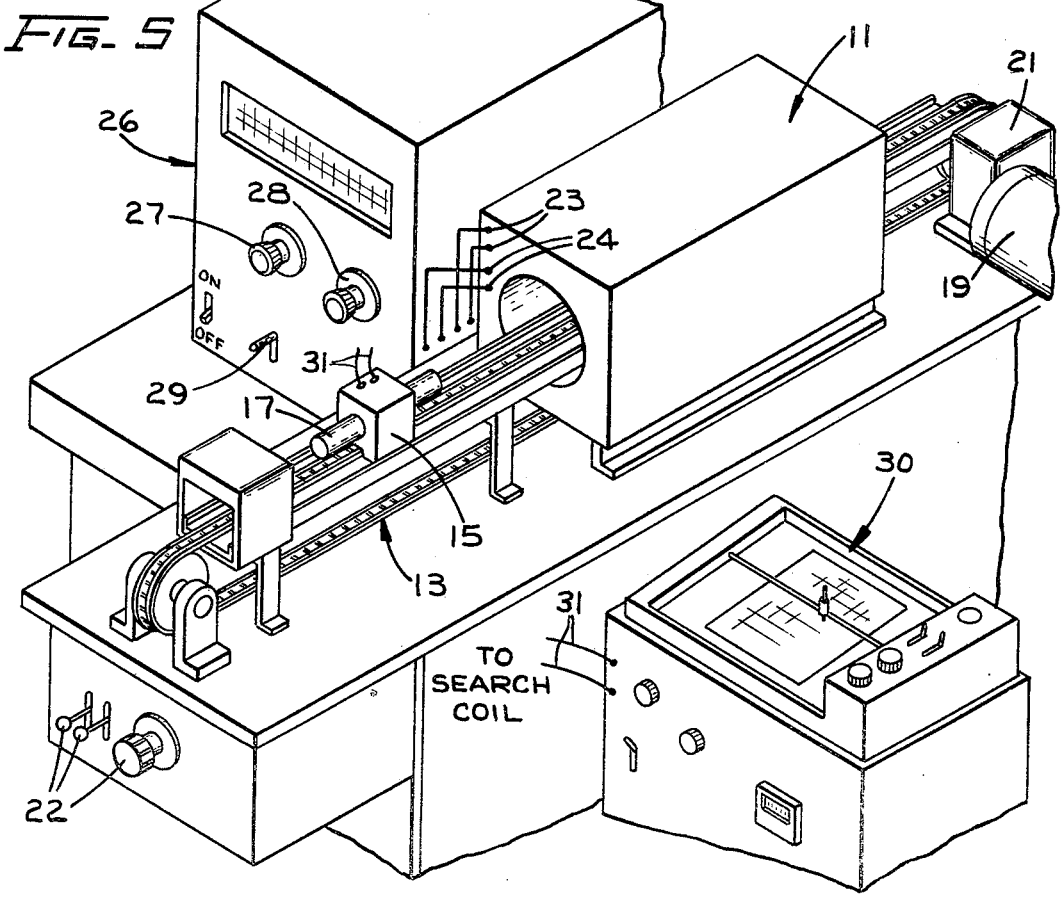
FIG. 5 is an isometric view disclosing in greater detail the apparatus embodying the principles of this invention.

The apparatus involved in measuring the coercive force of piece parts in accordance with a semi-automated method (as well as for an automated method) of this invention is depicted in FIGS. 4–6. As best seen in FIGS. 4 and 5, the apparatus comprises a solenoid 11, preferably of the coaxial type described in greater detail hereinafter, a reversible chain driven carriage mechanism 13, for transporting a search coil 15 together with an axially positioned piece part 17 to be tested, into and out of the solenoid 11, and a compensating coil 16 (seen in FIG. 4), suitably positioned near the end of the solenoid in the manner described hereinafter. A small motor 19, coupled to a gear reduction unit 21, drives the carriage 13 in response to the appropriate actuation of the controls 22 on the front panel of the carriage mechanism. As depicted in FIG. 4, a series circuit is completed from terminal 31 of the hysteresigraph 30 (FIG. 5) through the search coil 15, and then through a switch 32, or through the switch and the compensating coil 16 (wound to be in series opposing relationship with the search coil 15), back to the other terminal 31 on the hysteresigraph.

In practice, the solenoid field, after saturating a part, is generally maintained until the carriage 13 slowly moves the piece part under test, and its associated search coil, out of the solenoid and back to its initial position. In this manner, gradual, stepless reduction in the saturating field, uniform from test-to-test, is made possible. It, of course, should be understood that a gradual reduction in the saturating field impressed upon the part could also be accomplished by gradually reducing the field current with or without movement of the part.

Since the saturating solenoid must be capable of producing relatively high fields with reasonable currents, the field vs. current relationship thereof is generally in the order of 200 oersteds per ampere. If the same solenoid is to be used to measure coercive forces of approximately one oersted or less, very accurate control of a few milliamperes of current is required, which is difficult to accomplish in practice with a conventional high current power supply.

In accordance with the present invention, this problem is eliminated by utilizing a second, preferably single layer solenoid 11b, nested within the saturating solenoid 11a, for establishing the negative magnetizing field to drive the remanent flux of a part under test to zero. The construction of such a solenoid illustrated in cross section in FIG. 6. With such a coaxial solenoid, magnetic field vs. current relationships of approximately ten oersteds per ampere may be realized in practice with the saturating winding 11a, and approximately one oersted per about 100 milliamperes of current may be realized with the single layer winding 11b.

In the illustrative embodiment, current is supplied to the two coaxial windings 11a and 11b of the solenoid through lead pairs 23 and 24, respectively, which are in turn connected to a multi-tapped power supply 26 (symbolically shown in FIG. 5). The currents supplied to the two windings are selectively controlled by adjustable rheostats, only the control knobs 27, 28 thereof being shown on the front panel of the power supply. The direction of current flow through the windings is controlled by a toggle switch 29. It is to be understood that any suitably controlled and regulated power supply having the requisite power capabilities may be used.

By way of example only, the coaxial solenoid in one illustrative embodiment measured 16 inches in length, 2¼ inches I.D. and 6 inches O.D. The main saturating winding was wound with No. 16 gauge Formex coated copper wire, and the inner control winding was wound with the same type of wire. Reverse current in the inner single layer solenoid winding ($K=9.0$ oersteds per ampere) was about 100 milliamperes and was easily controlled.

In practice, the search coil, having many turns of wire to provide high sensitivity, fits loosely around the part. Therefore, to minimize errors when measuring both remance and coercive force, the errors being caused by differences experienced between successive piece part cross-sectional areas and the search coil effective area, a compensating coil is normally required.

To effect the desired compensation, the compensating coil 16 must be located so as to prevent errors due to flux pick-up therein from the part under test. This can be accomplished by placing the compensating coil in a second remotely located solenoid. However, with a sufficiently long saturating solenoid 11, the compensating coil can be advantageously located in the field gradient near the end of this solenoid, which is a much more convenient arrangement.

In accordance with one embodiment, the compensating coil is wound in series opposing relationship with respect to the search coil, and has approximately twice the turns-area value of the search coil. The compensating coil is adjusted, either manually or by any other suitable means, at a position near the end of the solenoid (where its field vs. current constant is half that at the center of the solenoid), until substantially complete compensation is obtained. With sufficiently long solenoid, flux reaching the compensating coil from the part under test will be negligible. Coersive force values are thus seen to be intrinsic values, but for most relay materials this is insignificant.

The use of a compensating coil also results in an astatic measuring arrangement which is immune to changes in the earth's field. However, whenever it is anticipated that values of coercive force will be less than a few oersteds, the "earth's magnetic field" should be constantly borne in mind. Careful orientation of the parts under test so as to be perpendicular to the horizontal component of the earth's field will minimize errors otherwise experienced. For L-shaped parts, the short leg is usually "vertical" and must be oriented perpendicular to the angle of declination of the earth's field. The earth's field itself, of course, should preferably remain constant, at least in direction while tests are being conducted. Also, by placing the solenoid a few feet away from large ferrous masses, field gradients and other induced effects generated by the solenoid itself will be reduced.

As a further refinement of the aforementioned method and apparatus embodied herein, an electronic hysteresigraph 30, including a built-in recording fluxmeter and programmable power supply (as symbolically shown in FIG. 5), may be used. With this equipment, remanent flux in the part is first recorded as a vertical line, its upper end representing the $B_{(REM)}$ point of a skewed hysteresis loop, if completely recorded, and its lower end coinciding with the zero flux origin. The length of this vertical line thus represents the total flux initially remaining in the saturated piece part (see FIGS. 2 and 3). After the remanence measurement and upon re-saturating the part, the recording pen is started at the upper end ($B_{(REM)}$ point) of the vertical line. The reverse current thereafter applied to the solenoid then drives the recording pen of the hysteresigraph from the $B_{(REM)}$ point downwardly through the H-abscissa, thereby actually recording the second quadrant of a skewed hysteresis loop for that part, as depicted in FIG. 3. This represents the flux vs. negative magnetizing force along that portion of the loop.

By expanding the H axis scale as required for the field vs. current constant of the particular solenoid employed coercive force is then indicated directly by the displacement of the return portion of the recorded loop from the origin, as measured along the H abscissa. Advantageously, the automated technique of measuring coercive force substantially reduces the work required of an operator, by eliminating the need to accurately adjust the demagnetizing current while reading the value of flux obtained.

In addition, it has been found that a hysteresigraph can be used in a manner which makes it possible to eliminate the compensating coil in the actual measurement of coercive force in accordance with principles of the present invention. More specifically, and with reference to FIG. 7, instead of recording the lines defined between $B_{(REM)}-0$ and $B_{(REM)}-H_C$, representative of a part measured in a compensated search coil (the significance of these lines having been discussed hereinabove in connection with FIG. 3), the lines defined between $B_{(REM)}-H_{C'}$ and between $0-H_{C'}$ are recorded.

Recorded line $B_{(REM)}-H_{C'}$ has a steeper slope than the recorded line $B_{(REM)}-H_C$ because the remanent flux decays more rapidly as the negative magnetizing flux is building up in a part inserted within an uncompensated search coil. Recorded lines $0-H_{C'}$ is generated by starting the recording pen at the zero flux origin of the hysteresigraph and then increasing the negative magnetizing field (or force) of the solenoid with only the search coil inserted therein until the resultant recorded line crosses the downwardly sloping line (or vice versa), the intersecting point thus defining $H_{C'}$. It is thus seen that the line $0-H_{C'}$ represents the flux change in the search coil due only to the reverse magnetizing field. Significantly, once the $H_{C'}$ point is ascertained, coercive force for a part being measured in an uncompensated search coil is directly represented by the horizontal scaled distance measured between the B–H origin and the point $H_{C'}$, with this distance being most easily correlated with the scaled H-abscissa by constructing a vertical projection (shown dotted in FIG. 7) from the point $H_{C'}$ upward until it intersects the H-abscissa.

As thus described, a hysteresigraph can very advantageously be employed to accurately measure the coercive force of piece parts on an automated basis either with or without a compensated search coil being employed in the measurement.

By way of illustration only, FIG. 8 discloses a table of coercive force measurements for six "calibrated" low carbon steel samples. Three of the samples comprise U type relay cores whose coercive forces have been determined by means of both a permeameter and Chattock potentiometer connected to a hysteresigraph, and by the present automated method utilizing a compensated search coil. The other three samples were cylindrical shells first wound as ring samples so as to permit measurement by the standard Rowland ring method, and by the aforementioned automated method. As readily seen from the table of FIG. 8, the measurement results obtained by the present method in question compare very favorably with those obtained by the prior laboratory standard methods.

In summary, an extension of remanence testing has been shown to provide a means of obtaining accurate values of coercive force of piece parts, such as relay cores, which depart considerably from the ideal ring or elongated rod shaped test geometries. Moreover, the test results obtained with the present methods and apparatus on parts having simple geometries have been found to compare favorably with results obtained with prior methods necessitating laboratory-type apparatus considerably more complex, expensive and cumbersome than that involved with the subject embodiments.

What is claimed is:

1. A method of measuring the coercive force of a specimen, comprising:

initially saturating the specimen to be measured within a first magnetic field;

removing said specimen from said first magnetic field and measuring the remanent magnetic flux retained thereby;

re-saturating said specimen while positioned within a search coil in a second magnetic field;

reducing said second magnetic field to zero;

determining the coercive force of said specimen by subjecting said specimen to a third magnetic field established in a field vs. current calibrated solenoid, said third magnetic field being of a polarity opposite to at least said first saturating magnetic field and sufficient strength to drive the remanent magnetic flux in said specimen, as determined by said previous remanence measurement to zero, as evidenced by the flux approaching zero in said search coil, said coercive force being represented by the negative magnetizing force required to drive said remanent flux of said specimen to zero as revealed from the previously calibrated statistical data correlating the field vs. current relationship of said solenoid, and prior to subjecting said specimen to said third magnetic field, positioning a compensating coil near the end of the solenoid where its field vs. current constant is half the value produced at the center of the solenoid, and being in series opposed relationship relative to said search coil, for minimizing errors caused by differences between successive specimen cross-sectional areas and the effective area of the associated search coil, the compensating coil being adjusted in the field gradient near the end of the solenoid until substantially complete compensation for the presence of the search coil within the solenoid is attained.

2. A method of measuring the coercive force of piece parts which may have a geometry which departs appreciable from a standard ring or an elongated rod shaped test specimen, comprising:

initially saturating the part to be measured within a first magnetic field;

removing said part from said first magnetic field and recording the resultant remanent flux retained in said part as a vertical line along the B ordinate of a hysteresis graph, the B–H origin representing the lower end of the recorded vertical line, and the upper end thereof representing the total remanent flux retained by said part;

inserting said part in a search coil and re-saturating said part in a second magnetic field;

reducing said second magnetic field to zero;

subjecting said saturated part to a third magnetic field, said third magnetic field being of a polarity opposite to at least said first saturating field, and of sufficient strength to drive the remanent magnetic flux retained by said part, as represented by said previously recorded vertical line, at least to zero, and recording the change in flux vs. negative magnetizing force resulting from driving said remanent magnetic flux retained in said part to zero, starting from the upper end of said recorded vertical line and extending downwardly through the zero flux, H-absicissa of the hysteresis graph, the last-mentioned recorded sloping line comprising the second quadrant of a hysteresis loop for the part under measurement, and the distance between the zero flux origin and the intersection of the recorded sloping line with the H-abscissa being representative of the actual coercive force of said part.

3. A method in accordance with claim 2 wherein an additional step comprises:

measuring and recording the flux vs. negative magnetizing force established in driving the remanent flux of said re-saturated part to zero while in the solenoid by utilizing a hysteresigraph with an associated recording fluxmeter.

4. A method in accordance with claim 2 wherein additional steps comprise:
loosely positioning the part within the search coil while in said first, second and third magnetic fields, and
positioning a compensating coil within at least said third magnetic field in series opposing relationship relatve to said search coil for minimizing errors caused by differences between successive specimen cross-sectional areas and the effective area of the associated search coil.

5. A method in accordance with claim 4 wherein at least said third magnetic field is produced by a field vs. current calibrated solenoid, and wherein said compensating coil has approximately twice the turns-area value of the search coil, and is positioned near the end of the solenoid where its field vs. current constant is half the value produced at the center of the solenoid, the compensating coil being adjusted in the field gradient at the end of the solenoid until substantially complete compensation for the presence of the search coil within the solenoid is attained.

6. A method of measuring the coercive force of piece parts which may have a geometry which departs appreciably from a standard ring or an elongated rod-shaped test specimen, comprising:
initially saturating the part to be measured within a first magnetic field;
removing said part from said first magnetic field and recording the resultant remanent flux retained in said part as a vertical line along the B ordinate of a hysteresis graph, the B–H origin representing the lower end of the recorded vertical line, and the upper end thereof representing the total remanent flux retained by said part;
inserting said part in an uncompensated search coil and re-saturating said part in a second magnetic field;
reducing said second magnetic field to zero;
subjecting said saturated part to a third magnetic field, said third magnetic field being of a polarity opposite to at least said first saturating field, and of sufficient strength to drive the remanent magnetic flux retained by said part, as represented by said previously recorded vertical line, to zero;
recording the change in flux vs. negative magnetizing force resulting from driving said remanent magnetic flux retained in said part to zero, said recording starting from the upper end of said recorded vertical line and extending downwardly through the zero flux, H-abscissa of the hysteresis graph, the last-mentioned recorded sloping line comprising the second quadrant of a hysteresis loop for the part under measurement;
subjecting only said uncompensated search coil to a fourth magnetic field, said fourth magnetic field being of the same negative polarity as said third magnetic field;
recording the flux vs. negative magnetizing force resulting from said search coil being subjected to said fourth magnetic field, said last-mentioned recording starting from the zero flux origin of the hysteresis graph and extending downwardly and outwardly therefrom as a substantially straight line while said fourth magnetic field is being increased in magnitude until said last-mentioned recorded line intersects the downwardly sloping line generated by said third magnetic field, and
locating a point along the H-abscissa of the hysteresis graph which is defined by a vertical projection upward from the point of intersection established by the recorded lines generated by said third and fourth magnetic fields, the distance between said zero flux origin of the hysteresis graph and said located point along said H-abscissa being representative of the actual coercive force of said part.

7. A method in accordance with claim 6 wherein at least said third magnetic field is produced by a field vs. current calibrated solenoid, and wherein the changes in flux vs. negative magnetizing force resulting from establishing and varying said third and fourth magnetic fields are measured and recorded by utilizing a hysteresigraph with an associated recording fluxmeter.

8. Apparatus for measuring the coercive force of a specimen, comprising:
a solenoid having a main winding wound about a core for establishing a magnetic field for saturating the specimen to be measured;
an auxiliary winding of fewer turns than and coaxially positioned with respect to said main winding and wound about said core of said solenoid for effecting fine control over the field vs. current relationship of said solenoid, and
means connected to said solenoid for selectively applying adjustable and reversible current to said main and auxiliary windings, respectively.

9. Apparatus for measuring the coercive force of piece parts which may have a geometry which departs appreciably from a standard ring or an elongated rod shaped test specimen, comprising:
a field vs. current calibrated solenoid having a main winding for establishing a magnetic field for saturating a particular part to be measured;
an auxiliary winding of fewer turns than and coaxially positioned relative to said main saturating winding of said solenoid for effecting fine control over the field vs. current relationship of said solenoid;
means connected to said solenoid for selectively applying adjustable and reversible currents to said main and control windings respectively so as to effect selective control over both the magnitudes and polarities of the magnetic fields respectively established by said main and auxiliary windings;
a search coil, within which the given part to be measured is loosely positioned, being adapted for insertion into and withdrawal from said solenoid;
a compensating coil wound in series opposed relationship with respect to said search coil, and having approximately twice the turns-areas value of said search coil, said compensating coil being positioned near the end of the solenoid in a field gradient whereat substantially complete compensation is attained for the presence of said search coil whenever positioned within the solenoid while energized;
a fluxmeter having an input connected to the search coil for measuring the remanent flux in the part after the latter has been saturated, and
a hysteresigraph connected to said fluxmeter for initially recording the value of remanent flux retained by the saturated part, said recorded value being represented by a vertical line along the B ordinate of a hysteresis graph, the lower end of the recorded line coinciding with the B–H origin of the hysteresis graph, and the upper end thereof being representative of the total remanent flux retained by the part, said hysteresigraph further being adapted to record the flux vs. negative magnetizing force required to drive the remanent flux retained by the part being measured to zero, said last-mentioned recording starting from the upper end of said previously recorded vertical line and then extending downwardly and outwardly so as to intersect the zero flux line (H-abscissa) of the hysteresigraph, the last-mentioned intersecting point indicating the actual scaled value of coercive force associated with the particular part being measured.

10. Apparatus for measuring the coercive force of piece parts in accordance with claim 9 further comprising:
carriage means to transport the piece part to be measured and said search coil associated therewith into and out of said solenoid, said carriage means at least withdrawing each saturated part from said solenoid at a rate of speed such that each successive part is subjected to a uniform, substantially stepless reduction in the saturating field of said solenoid from test to test.

11. Apparatus for measuring the coercive force of a specimen, comprising:
- a solenoid having a main winding wound about a core for establishing a magnetic field for saturating the specimen to be measured;
- aan auxiliary winding of fewer turns than and coaxially positioned with respect to said main winding and wound about said core of said solenoid for effecting fine control over the field vs. current relationship of said solenoid;
- means connected to said solenoid for selectively applying adjustable and reversible currents to said main and auxiliary windings, respectively;
- a search coil within which the given part to be measured is loosely positioned, being adapted for insertion into and withdrawal from said solenoid;
- a compensating coil having approximately twice the turns-area value of the search coil, said compensating coil being wound in series opposed relationship with respect to said search coil and being positioned near the end of the solenoid in a field gradient whereat substantially complete compensation is attained for the presence of the search coil in the solenoid when energized, and
- carriage means provided to transport said specimen and associated search coil into and out of said solenoid, said carriage means at least withdrawing each saturated specimen from said solenoid at a rate of speed such that each successive specimen is subjected to a uniform, substantially stepless reduction in the saturating field of said solenoid from test to test.

References Cited

UNITED STATES PATENTS 2,097,947   11/1937   Fahy _____ 324—34
2,541,618   2/1951    Scott _____ 324—34

OTHER REFERENCES

Watkins: "A Null Point Method of Coercivity Determination," Jour. of Sci. Inst., February 1954, pp. 69–70.

Stauss: "Magnetic Test for Relay Cores," Bell Lab. Record, January 1956, pp. 24, 25.

Blamberg et al.: "A Ferrometer From Finland," Jour. Inst. Elec. Engr., August 1958, pp. 449–453.

ALFRED E. SMITH, Primary Examiner

U.S. Cl. X.R.

324—34